Patented Oct. 19, 1926.

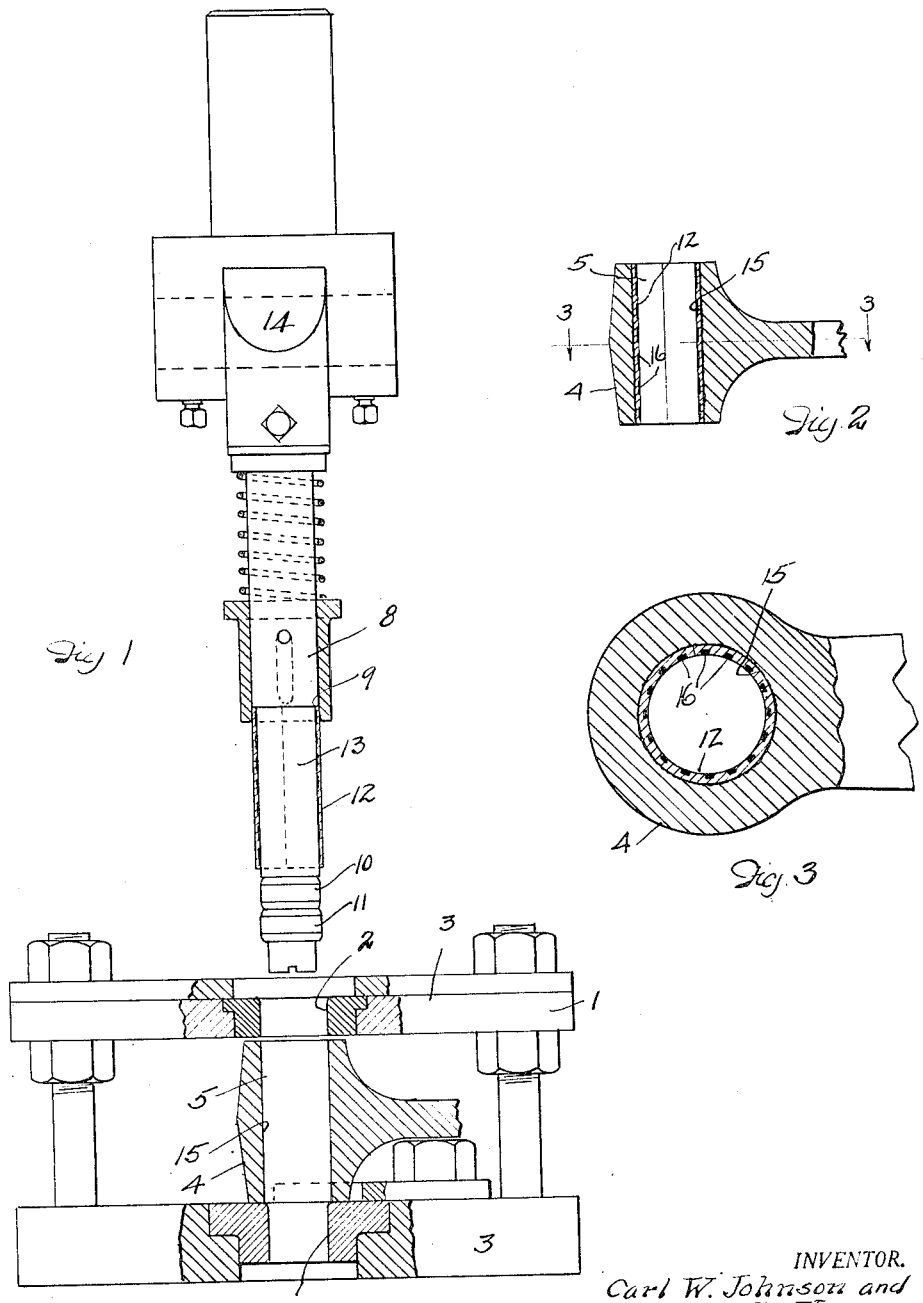

1,603,471

UNITED STATES PATENT OFFICE.

CARL W. JOHNSON, OF EAST CLEVELAND, AND JAMES L. MYERS, OF CLEVELAND HEIGHTS, OHIO, ASSIGNORS TO THE CLEVELAND GRAPHITE BRONZE COMPANY, OF CLEVELAND, OHIO, A CORPORATION OF OHIO.

METHOD AND DEVICE FOR INSTALLING BUSHINGS.

Application filed April 15, 1922. Serial No. 553,248.

The present invention relating, as indicated, to bushings, is more particularly directed to an improved method for placing and burnishing split self-lubricating metal bushings for the purpose of smoothing or burnishing the inside surface of the bushing and at the same time pressing the bushing into the irregularities of the wall of the hole in which it is to be placed. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is a side elevation, partially in section, showing one type of apparatus for carrying out our improved method; Fig. 2 is a vertical longitudinal section through an article in which a bushing has been set by our method; and Fig. 3 is a transverse section on the line 3—3 of Fig. 1.

The best type of bearing is one in which the bearing is perfectly fitted into the bore or hole in the article in which the bearing is to be placed, that is, one in which the outer wall of the bearing is supported at every point by the metal of the bore. In practice it is practically impossible to even approximate such a condition. Holes, whether reamed, bored, or reamed and ground, have very irregular walls, and bushings are ordinarily equally irregular on their outer surfaces and are also of such a rigid nature that they cannot give enough to fill up the irregularities in the bore. We have found, however, that with split bushings made of rolled material, which are hard without being brittle, and are somewhat ductile, it is possible to press the bushing into the bore in such a way as to force the ductile metal of the bushing into all of the irregularities in the bore and practically lock the bushing into place. At the same time the bearing surface of the bushing is burnished and polished and given a slight hardening action.

In Fig. 1 we have shown a jig 1 provided with aligned openings 2 and 2' and adapted to receive between the plates 3 and 3', in which are these openings, an article 4 into the bore 5 of which a bushing is to be pressed. This jig or fixture may be mounted in a small hand or power press which is provided with a reciprocating plunger 8. The plunger 8 is provided with a shoulder 9 and with one or more burnishing buttons 10 and 11 and has a stroke sufficient to pass the buttons 10 and 11 entirely through the bore 5 in the article which is to be bushed.

In use a split bushing 12 is slipped over the buttons 10 and 11 and onto the shank 13 of the plunger 8 into engagement with the shoulder 9. This may be done conveniently by mounting the plunger about transverse bearings 14 so that it may be swung away from the fixture to allow the operator to apply the bushing thereto. The plunger is now depressed until the bushing has been brought into place in the bore 5 of the article 4. There is enough spring in the bushing to cause it to open slightly and engage against the inner wall 15 of the bore. As the plunger is retracted the burnishing buttons 10 and 11 act, and of these buttons, the first one 10 is one-thousandth under the desired finished inside diameter of the bushing. All that this button does is to slightly spread the bushing and press it into the wall 15 of the hole 5. The second button 11 is one-thousandth over size and acts to flow the metal of the bushing very slightly, forcing it into all of the irregularities in the wall 15 of the hole 5. The irregularities in this wall 15 are illustrated in Fig. 2 and the relative soft metal of the bushing is forced into these and made to conform with the inside wall of the bore, with the result that the bushing is substantially locked into place and will not become loosened or fall out in use.

The bushing is of course enlarged by the action of the second button 11 to a diameter which is very slightly greater than the desired final diameter for the bushing. This can only be done because of the resiliency of the metal in the walls of the bushing and after the passage of this burnishing button the inherent resiliency in the metal returns the inside diameter of the bearing to exactly the desired finished size while this does not affect the engagement between the exterior walls of the bushing and the interior walls of the bore of the hole.

The present method is designed for use with split, relatively soft bushings which are provided, as shown in Figs. 2 and 3, with indentations in their inner surfaces, which are filled with a lubricating mixture, indicated at 16. Bushings of this type cannot by the present method be fitted into a hole that is very greatly over size, as only a slight burnishing or flowing action can be secured, as otherwise the metal of the bushing would flow over or squeeze out the lubricating material in the indentations. We have found, however, that even with bushings of this type it is possible to set the bushing into the irregularities of the bore and to give a slight burnishing action to the surface of the bushing. The advantage of this method are the improved condition of the surface of the bearing and the very much more secure engagement between the bearing and the bore.

The advantages of the present method of installing bushings are that it produces a very much superior bearing surface which is very highly polished and is quite hard, it securely engages the metal of the bushing in the irregularities of the wall of the hole, it permits extremely accurate and rapid assembly, and finally the assembly may be accomplished by an operation which also provides for burnishing and sizing the bushing at the same time.

Other forms may be employed embodying the features of our invention instead of the one herein explained, change being made in the form of construction, provided the elements stated by any of the following claims or the equivalent of such stated elements be employed, whether produced by our preferred method or by others embodying steps equivalent to those stated in the following claims.

We therefore particularly point out and distinctly claim as our invention:—

1. In a method of installing bearings, the steps which consist in pressing a longitudinally split bushing into a solid integral non-expansible article having a hole therein, said bushing being formed of relatively thin material, having a series of lubricant containing pockets in its inner surface and having an inside diameter, when pressed into such hole, of not more than two thousandths of an inch undersize, and then enlarging such inside diameter to the desired finished size by causing the excess metal of said bushing to flow into the irregularities of the wall of such hole.

2. In a method of installing bushings, the steps which consist in pressing a longitudinally split bushing into a solid non-expansible article having a hole therein, said bushing being formed of relatively thin metal, having a series of lubricant containing pockets in its inner surface and having an inside diameter, when pressed into such hole, of not more than two-thousandths of an inch under size, and then burnishing said bushing and simultaneously enlarging such inside diameter to the desired finished size by causing the excess metal of said bushing to flow into the irregularities of the wall of such hole.

3. A device for installing bushings comprising a plunger provided with a bushing receiving portion and a shoulder at one end of such portion for engagement by said bushing, and said plunger being provided with a burnishing button portion at its outer end.

4. A device for installing bushings comprising a reciprocating member, a plunger pivotally mounted in said member, said plunger being provided with a shoulder and a bushing receiving portion adjacent thereto, and said plunger being also provided with a burnishing and an upsetting button portion adjacent its lower end.

Signed by us, this 10th day of April, 1922.

CARL W. JOHNSON.
JAMES L. MYERS.